US009852056B2

(12) United States Patent
Arges et al.

(10) Patent No.: US 9,852,056 B2
(45) Date of Patent: *Dec. 26, 2017

(54) MULTI-LEVEL MEMORY COMPRESSION

(71) Applicant: International Business Machines Corporation, Armonk, NY (US)

(72) Inventors: Christopher J. Arges, Austin, TX (US); Nathan Fontenot, Georgetown, TX (US); Jeffrey D. George, Austin, TX (US); Ryan P. Grimm, Austin, TX (US); Joel H. Schopp, Austin, TX (US); Michael T. Strosaker, Austin, TX (US); Mark W. VanderWiele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/025,449

(22) Filed: Sep. 12, 2013

(65) Prior Publication Data

US 2014/0244962 A1    Aug. 28, 2014

Related U.S. Application Data

(63) Continuation of application No. 13/775,636, filed on Feb. 25, 2013.

(51) Int. Cl.
*G06F 7/00*    (2006.01)
*G06F 17/00*   (2006.01)
(Continued)

(52) U.S. Cl.
CPC ............ *G06F 12/023* (2013.01); *G06F 12/08* (2013.01); *G06F 2212/401* (2013.01)

(58) Field of Classification Search
USPC ....................................................... 707/693
See application file for complete search history.

(56) References Cited

U.S. PATENT DOCUMENTS 5,293,164 A    3/1994    Bugajski et al. ............... 341/51
5,812,817 A    9/1998    Hovis et al.
(Continued)

FOREIGN PATENT DOCUMENTS

| CN | 1672135   | 9/2005  |
|----|-----------|---------|
| CN | 1846252   | 10/2006 |
| CN | 102541747 | 7/2012  |

OTHER PUBLICATIONS

Denning, PJ.-et al., "On the Management of Multilevel Memories;" ip.com, IPCOM000150148D; Apr. 17, 2007, 17 pages, originally published by Princeton University, Technical Report No. 76, Apr. 1969.

(Continued)

*Primary Examiner* — Muluemebet Gurmu
(74) *Attorney, Agent, or Firm* — VanLeeuwen & VanLeeuwen; Steven L. Bennett

(57) ABSTRACT

According to one embodiment of the present disclosure, an approach is provided in which a processor selects a page of data that is compressed by a first compression algorithm and stored in a memory block. The processor identifies a utilization amount of the compressed page of data and determines whether the utilization amount meets a utilization threshold. When the utilization amount fails to meet the utilization threshold, the processor uses a second compression algorithm to recompresses the page of data.

4 Claims, 10 Drawing Sheets

(51) Int. Cl.
*G06F 12/02* (2006.01)
*G06F 12/08* (2016.01)

(56) References Cited

U.S. PATENT DOCUMENTS

| | | | |
|---|---|---|---|
| 6,421,466 B1 | 7/2002 | Lin | 382/236 |
| 6,879,266 B1 | 4/2005 | Dye et al. | 341/51 |
| 2004/0114199 A1* | 6/2004 | Kanno | H04N 1/33323 358/474 |
| 2005/0071579 A1* | 3/2005 | Luick | G06F 12/04 711/154 |
| 2006/0002555 A1* | 1/2006 | Lekatsas et al. | 380/269 |
| 2006/0071579 A1 | 4/2006 | Kando | |
| 2006/0259681 A1* | 11/2006 | Rudelic et al. | 711/103 |
| 2007/0261059 A1* | 11/2007 | Orth | G06F 12/0284 719/312 |

OTHER PUBLICATIONS

Anonymous, "Method and System for Secured Caching of Data across a Multi-level Memory Hierarchy," ip.com, IPCOM00019694D, Jun. 21, 2010, 3 pages.

Annunziata, EJ.-et al., "Block Interleaving in Multilevel Memory Systems;" ip.com, IPCOM000079871D; Feb. 26, 1005, 3 pages, originally published by International Business Machines Corporation in IBM Technical Disclosure Bulletin, Sep. 1973, p. 1246.

\* cited by examiner

| Compressed Area 160 ||||
|---|---|---|---|
| Unallocated | Comp Fmt C | Comp Fmt B | Comp Fmt A |
| Comp Fmt A || Comp Fmt C ||
| Comp Fmt C | Unallocated |||
| Comp Fmt B | Comp Fmt A | Comp Fmt B ||
| Comp Fmt A | Comp Fmt A | Comp Fmt A ||
| Comp Fmt C | Comp Fmt B |||
| Comp Fmt C || Unallocated ||
| Comp Fmt B || Comp Fmt A ||
| Unallocated || Comp Fmt C ||
| Comp Fmt C || Unallocated ||
| Comp Fmt A | Unallocated | Unallocated ||
| Unallocated ||| Comp Fmt A |

FIG. 2

MULTI-LEVEL MEMORY COMPRESSION

BACKGROUND

The present disclosure relates to multi-level memory compression. More particularly, the present disclosure relates to storing pages of data in a memory at different compression levels based upon page utilization.

Computer systems compress data in order to reduce the amount of memory required to store data. Different compression algorithms compress data at different "compression ratios." A compression ratio is the ratio between the size of data when the data is compressed compared with the size of the data when the data is uncompressed (e.g., original size). Another industry term used to compare the amount of compression that a compression algorithm achieves is "compression space savings," which is computed by the formula "1-compression ratio." As such, highly compressed data results in a low compression ratio and a high compression space savings.

Although selecting a compression algorithm to achieve a high compression space savings is typically preferred for memory utilization purposes, these "high" compression algorithms typically require an increased amount of time and processor resources to compress/decompress data when compared to "low" compression algorithms.

BRIEF SUMMARY

According to one embodiment of the present disclosure, an approach is provided in which a processor selects a page of data that is compressed by a first compression algorithm and stored in a memory block. The processor identifies a utilization amount of the compressed page of data and determines whether the utilization amount meets a utilization threshold. When the utilization amount fails to meet the utilization threshold, the processor uses a second compression algorithm to recompresses the page of data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 2 is a diagram showing a compressed memory area that includes pages of data that are compressed according to various compression algorithms and stored in memory blocks having various pre-defined memory block sizes;

DETAILED DESCRIPTION

Figure 1:
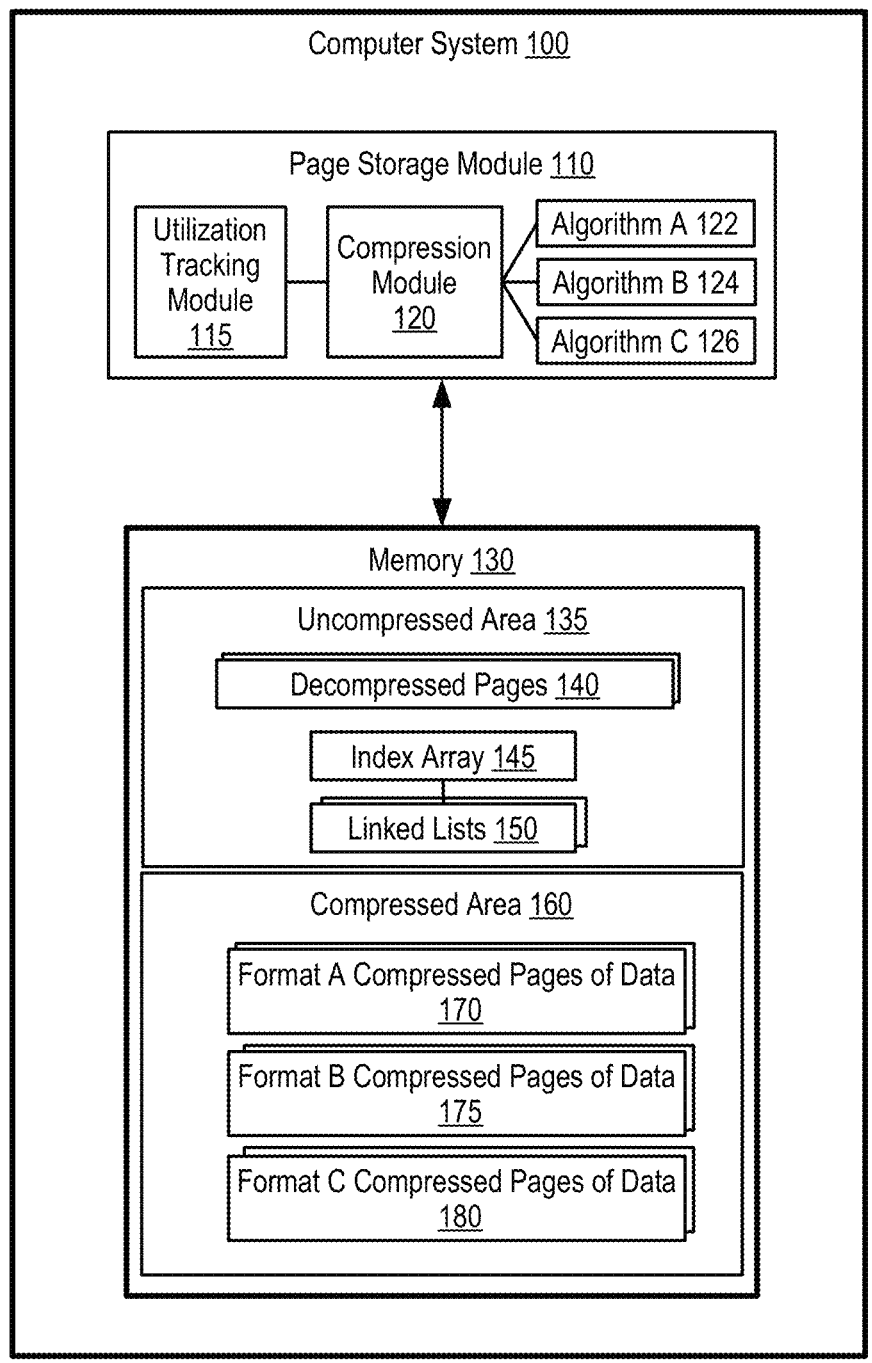
FIG. 1 is a diagram showing a computer system utilizing multiple compression algorithms to compress pages of data at various compression ratios and storing the compressed pages of data in a memory.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 is a diagram showing a computer system utilizing multiple compression algorithms to compress pages of data at various compression ratios and storing the compressed pages of data in a memory. This disclosure provides an approach to resolve a computer system's speed versus compressibility issues by providing multiple levels of compression in a compressed memory area. In one embodiment, when a page of data is first written to memory, the page of data is compressed according to a low compressibility compression algorithm. If the compressed page of data is utilized frequently, the computer system is able to take advantage of fast decompression speeds at the cost of compressibility. If the page of data is utilized infrequently, the computer system recompresses the page of data using a higher compressibility compression algorithm to increase available memory space.

Computer system 100 includes page storage module 110 and memory 130. Page storage module 110 includes access tracking module 115, which monitors page utilization activity to identify infrequently utilized compressed pages of data. In one embodiment, utilization tracking module 115 utilizes a LRU (least recently used) algorithm to identify compressed pages of data that are infrequently utilized. When utilization tracking module 115 identifies an infrequently utilized compressed page of data, compression module 120 decompresses/recompresses the page of data utilizing a higher compressibility compression algorithm (e.g., algorithms 122, 124, or 126) to generate a recompressed page of data that achieves an increased compression space savings.

Memory 130, in one embodiment, is computer system 100's main memory (e.g., not a cache) and includes an uncompressed area 135 and a compressed area 160. Uncompressed area 135 includes pages of data that have been decompressed and are in the process of being recompressed (decompressed pages 140, see FIGS. 6-8 and corresponding text for further details).

In addition to compressing pages of data using different compression algorithm formats (e.g., format A compressed pages of data 170, format B compressed pages of data 175, and format C compressed pages of data 180), compression module 120 stores the compressed pages of data in memory blocks that have various "pre-defined memory block sizes." In one embodiment, the pre-defined memory block sizes are in increments of 128 bytes (B), such as 128 B, 256 B, 384 B, and etcetera (see FIG. 2 and corresponding text for further details). Compression module 120 utilizes index array 145 and linked lists 150 to track unallocated memory blocks according to their pre-defined memory block sizes and, in turn, store compressed pages of data into an appropriately sized unallocated memory block (see FIG. 3 and corresponding text for further details).

In one embodiment, pages of data are decompressed and recompressed to increase compression space savings at timed intervals or in response to memory pressure. In this embodiment, when computer system 100 has a large amount of unallocated memory, page storage module 110 may recompress 2% of the pages of data in compressed area 160. However, if memory pressure continues to grow (e.g., less unallocated memory), page storage module 110 may recompress 30% of the pages of data in order to alleviate memory pressure. In this embodiment, the computer system may adjust a utilization threshold to trigger more or less pages of data to undergo recompression to achieve an increased space savings (see FIG. 6 and corresponding text for further details).

In one embodiment, utilization tracking module 115 and/or compression module 120 may be implemented in software, hardware, or a combination of hardware and software. In another embodiment, utilization tracking module 115 and compression module 120 may be a single module that is implemented in software, hardware, or a combination of hardware and software.

FIG. 2 is a diagram showing a compressed memory area that includes pages of data that are compressed according to various compression algorithms and stored in memory blocks having various pre-defined memory block sizes. Compressed area 160 concurrently stores compressed pages of data, with different compression formats, which are generated by different compression algorithms. In addition, compressed area 160 is segmented into memory blocks with "pre-defined memory block sizes."

The memory blocks may be combined and/or segmented into larger/smaller pre-defined memory block sizes as needed. For example, if page storage module 110 requires a 128 B memory block to store a compressed page of data, but only a 512 B memory block is available, page storage module 110 segments the 512 B memory block into a 128 B memory block and a 384 B memory block. In turn, page storage module 110 utilizes the 128 B memory block to store the compressed page of data and tags the 384 B memory block as an unallocated memory block. Page storage module 110 utilizes index array 145 and linked lists 150 to track the unallocated memory blocks (see FIG. 3 and corresponding text for further details).

Figure 3:
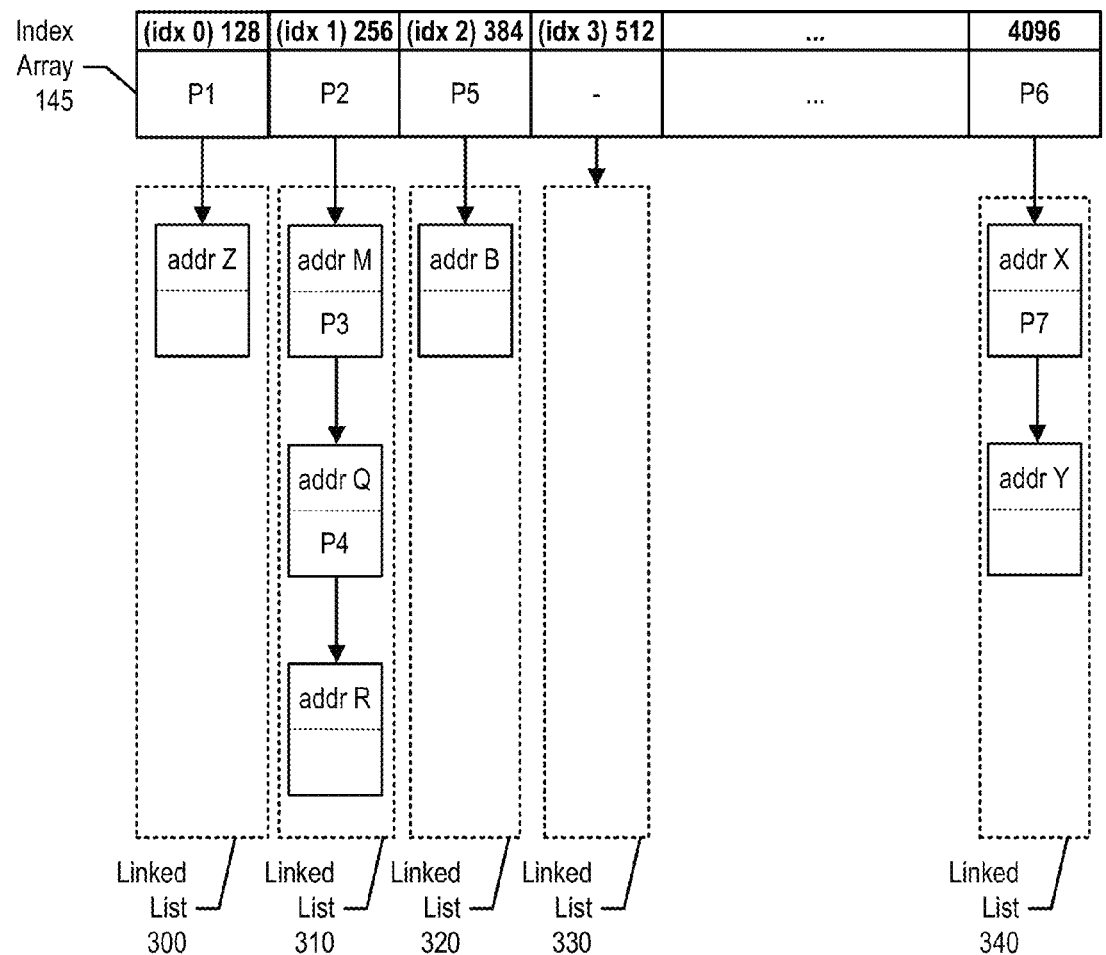
FIG. 3 is a diagram showing an index array and linked lists that track different unallocated memory block sizes.

FIG. 3 is a diagram showing an index array and linked lists that track different unallocated memory block sizes. Index array 145 includes indexes that correspond to various pre-defined memory block sizes of unallocated memory blocks. Each of linked lists 300, 310, 320, 330, and 340 correspond to one of the indexes to track their corresponding unallocated memory block sizes. The example in FIG. 3 shows that the first index (idx 0) corresponds to unallocated memory blocks of 128 B and includes a pointer to the first link in linked list 300, which includes a memory block address for memory block "Z".

When multiple memory blocks are unallocated for a particular memory block size, a "link" is added to the corresponding linked list. For example, linked list 310 includes three links, which store addresses for memory blocks M, Q, and R. Index 1's pointer "P2" points to the first link (addr M), and the first link's pointer "P3" points to the second link (addr Q), etc.

In one embodiment, page storage module 100 is able to traverse through index array 145 to identify unallocated memory block sizes by checking whether the indexes include a pointer to a first link. If a particular index does not include a pointer (e.g., idx3 512 shown in FIG. 3), then unallocated memory blocks are not available for that particular memory block size.

Figure 4:
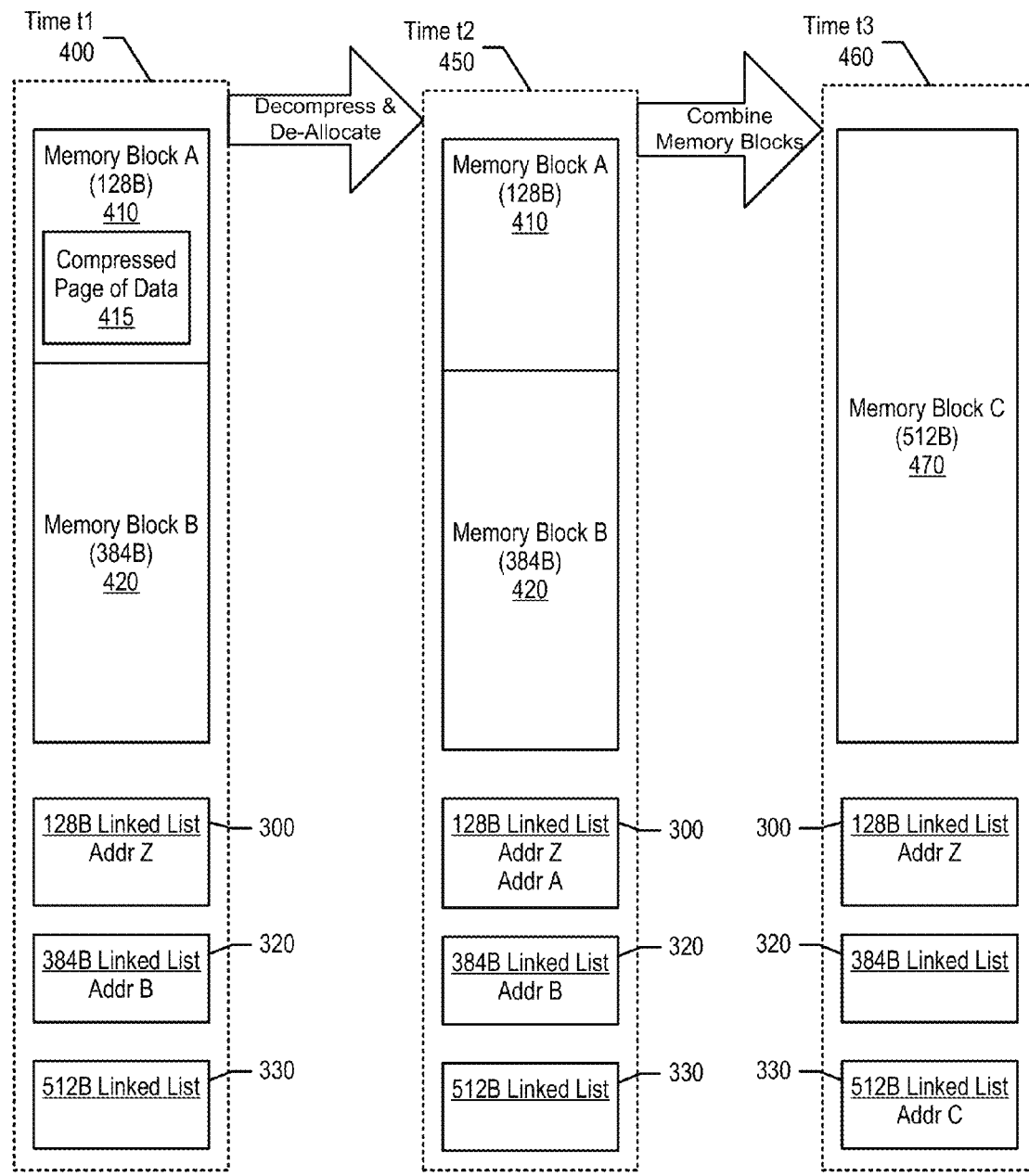
FIG. 4 is a diagram showing, over time, memory block allocation and linked list updates when a compressed page of data is decompressed for subsequent recompression.

FIG. 4 is a diagram showing, over time, memory block allocation and linked list updates when a compressed page of data is decompressed for subsequent recompression. At time t1 400, compressed page of data 415 is stored in memory block A 410, which is 128 B in sized. Also at time t1 400, memory block B 420 is unallocated, which is 384 B in size. As such, 384 B linked list 320 includes a link with memory block B's address, indicating that memory block B 420 is 384 B and unallocated. 128 B linked list 300 includes a link correspond to memory block "Z," which is an available 128 B memory block not shown in FIG. 4. As can be seen, at time t1 400, no 512 B memory blocks are unallocated according to 512 B linked list 330.

Moving to time t2 450, subsequent to compressed page of data 415 being removed from memory block A 410 and decompressed, memory block A 410 is unallocated and, in turn, 128 B linked list 300 includes a link with memory block A's address. At time t2 450, 384 B linked list 320 still includes a link that includes memory block B's address, and 512 B linked list 330 does not include a link.

Moving to time t3 460, memory block A 410 is combined with memory block B 420 to create memory block C 470, which is 512 B in size. As a result, the links that included addresses for memory block A 410 and memory block B 420 are removed from 128 B linked list 300 and 384 B linked list 320, respectively, and a link that includes an address for memory block C 470 is added to 512 B linked list 330. Page storage module 110 combines unallocated memory blocks in order to have larger memory block sizes available for larger compressed pages of data. These larger memory blocks, however, may be segmented into smaller memory blocks on an as needed basis (see FIG. 5 and corresponding text for further details).

Figure 5:
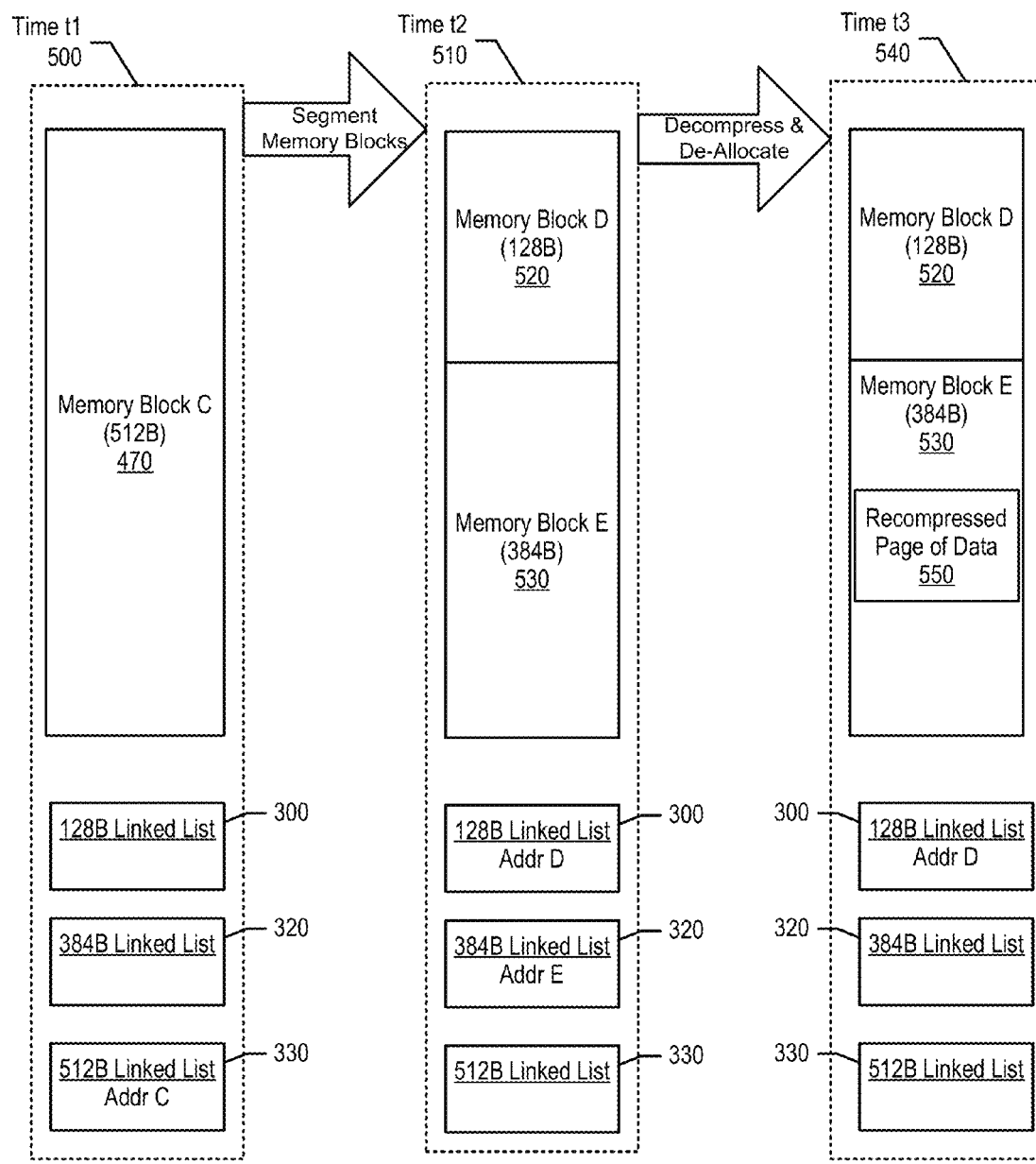
FIG. 5 is a diagram showing, over time, a memory block segmented into multiple memory blocks and a recompressed page of data stored into one of the segmented memory blocks.

FIG. 5 is a diagram showing, over time, a memory block segmented into multiple memory blocks and a recompressed page of data stored into one of the segmented memory blocks. FIG. 5 shows three points in time that occur when a small unallocated memory block is not available to store a small recompressed page of data. At time t1 500, memory block C 470, which is 512 B in size, is unallocated and, as such, 512 B linked list 330 includes a link with memory block C's address. In addition, at time t1 500, no 128 B memory blocks or 384 B memory blocks are unallocated and, therefore, 128 B linked list 300 and 384 B linked list 320, respectively, do not include links with unallocated memory block addresses.

Moving to time t2 510, subsequent to page storage module 110 determining that a memory block is not available with a size corresponding to a "preferred pre-defined memory block size," page storage module 110 segments memory block C 470 into two memory blocks, which are memory block D 520 (128 B in size) and memory block E (384 B in size). In turn, a link is added to 128 B linked list 300 with memory block D 520's address and a link is added to 384 B linked list 320 that includes memory block E 530's address. Likewise, the link with memory block C 470's address is removed from 512 B linked list 330.

Moving to time t3, page storage module 110 stores recompressed page of data 550 in memory block E 530 and, in turn, removes the link with memory block E 530's address from 512 B linked list 320.

Figure 6:
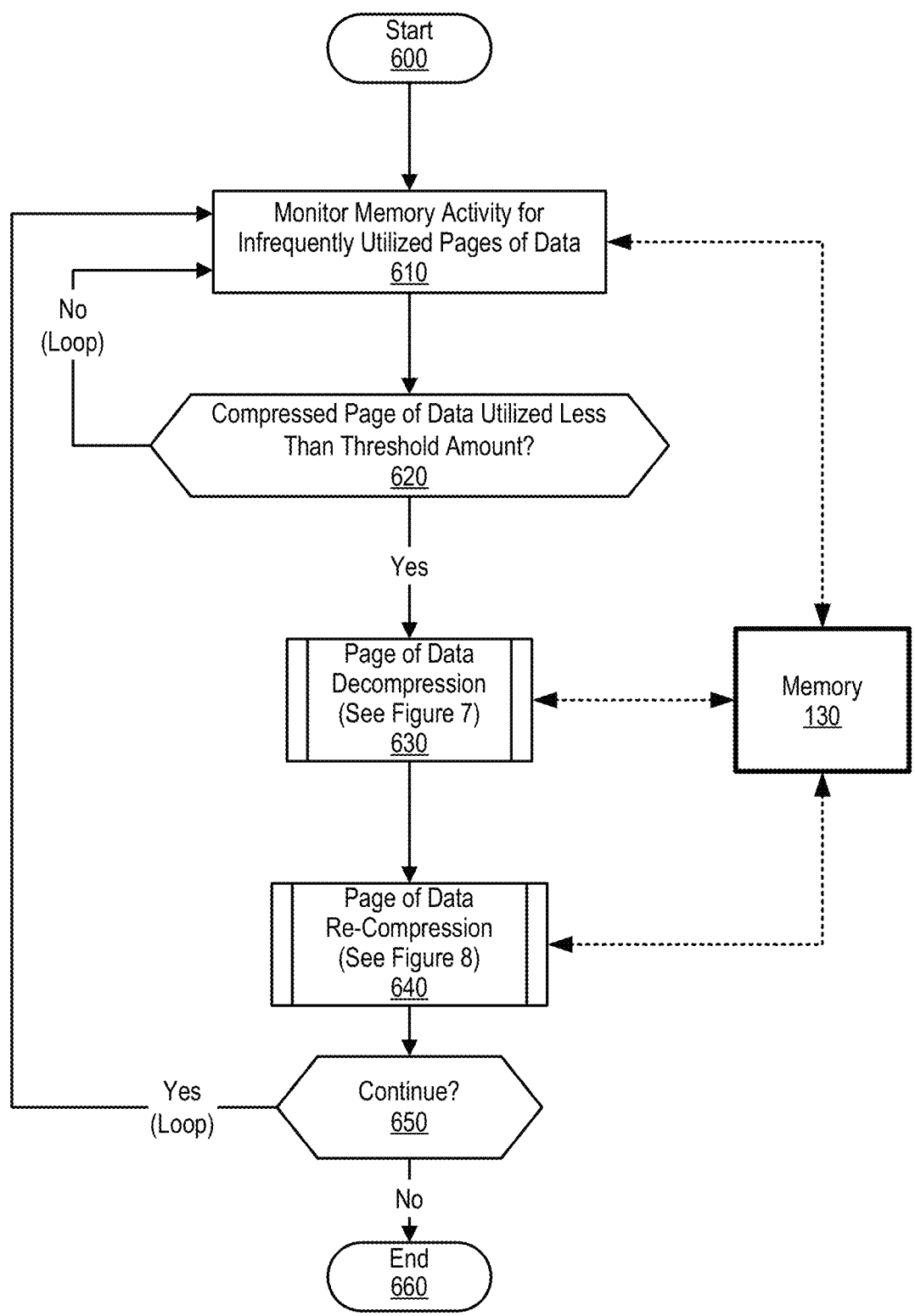
FIG. 6 is a high-level flowchart showing steps taken in managing compressed pages of data within a memory area.

FIG. 6 is a high-level flowchart showing steps taken in managing compressed pages of data within a memory area. Processing commences at 600, whereupon processing (e.g., page storage module 110) monitors memory activity within memory 130 to search for infrequently utilized pages of data that are compressed by a particular compression algorithm (step 610). In one embodiment, processing may utilize techniques such as a least recently used (LRU) algorithm to find compressed pages of data that are infrequently utilized.

A determination is made as to whether a compressed page of data was identified that was utilized less than a utilization threshold (decision 620). In one embodiment, processing may determine a number of access times that a compressed page of data was utilized over a pre-defined time period and compare the number of access times to a pre-defined utilization threshold. The pre-defined utilization threshold, in this embodiment, indicates whether a page of data has been utilized enough as to not increase compression of the page of data due to infrequent utilization. In another embodiment, the utilization threshold may be adjusted based upon memory pressure to increase or decrease the amount of pages of data to recompress (e.g., increase the utilization threshold to increase the amount of pages of data to recompress).

If processing did not locate a compressed page of data with infrequent utilization, decision 620 branches to the "No" branch, which loops back to continue to monitor memory 130's activity. This looping continues until processing identifies a compressed page of data that is infrequently utilized, at which point decision 620 branches to the "Yes" branch.

Figure 7:
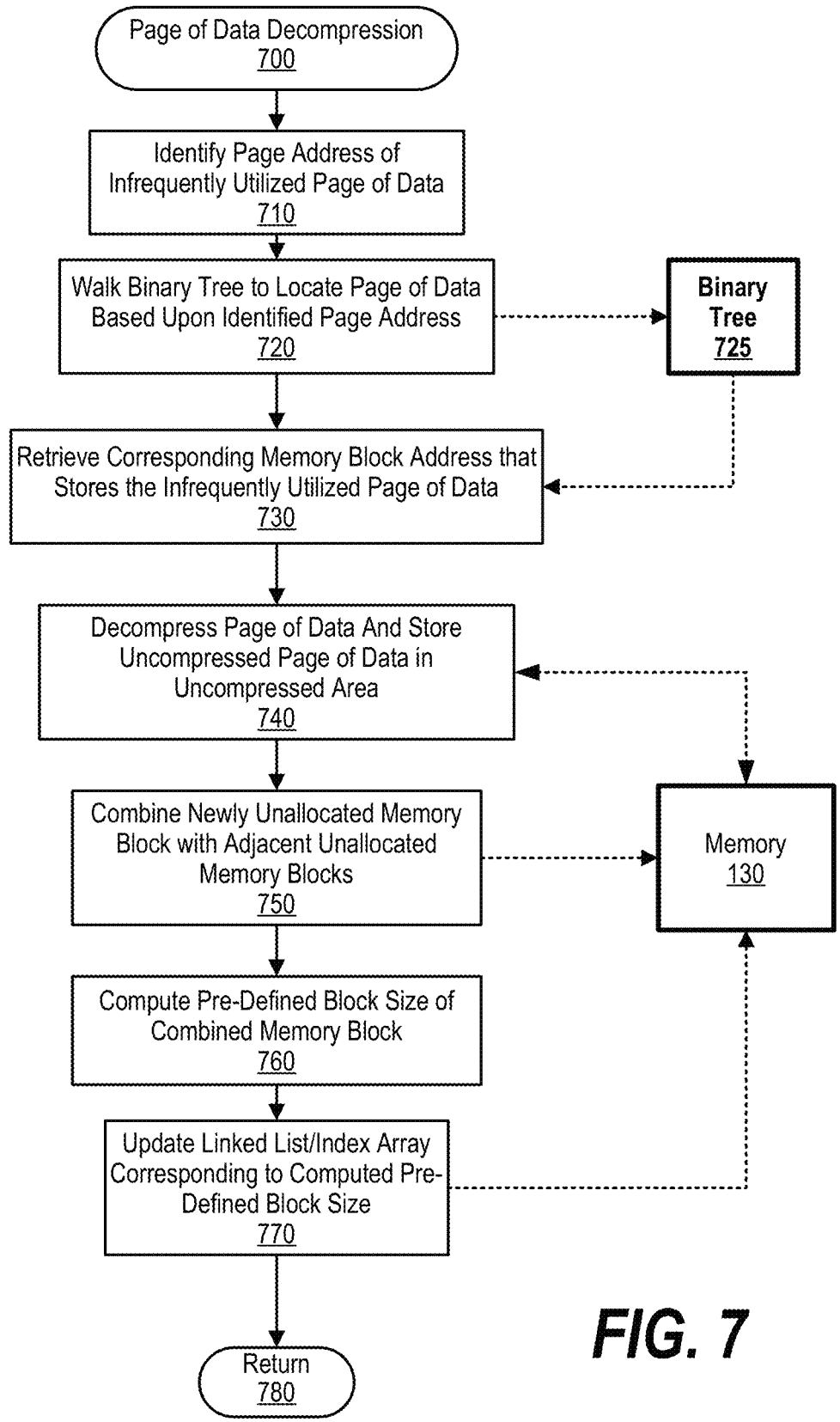
FIG. 7 is a flowchart showing steps taken in decompressing a compressed page of data that has been utilized infrequently.

Processing locates a memory block in memory 130's compressed area 160 that stores the infrequently utilized compressed page of data, and decompresses the compressed page of data accordingly (pre-defined process block 630, see FIG. 7 and corresponding text for further details). In one embodiment, processing "walks" a binary tree, whose nodes are organized according to page of data addresses, in order to identify a node corresponding to the address of the page of data. In this embodiment, processing locates the corresponding node and retrieves a memory block address from the node. Processing retrieves the compressed page of data from the memory block, decompresses the page of data, and stores the decompressed page of data in uncompressed area 135. In turn, processing combines the newly unallocated memory block with adjacent unallocated memory blocks and updates linked lists 150 and index array 145 accordingly (see FIG. 7 and corresponding text for further details).

Processing then recompresses the decompressed page of data according to a higher compressibility compression algorithm (e.g., one that generates an increased compression space savings) and locates a memory block within memory 130 that is large enough to store the recompressed page of data. Once located, processing stores the recompressed page of data in the located memory block and updates index array 145 and linked lists 150 accordingly (pre-defined process block 640, see FIG. 8 and corresponding text for further details).

A determination is made as to whether to continue monitoring memory 130 (decision 650). If processing should continue to monitor memory 130, decision 650 branches to the "Yes" branch, which loops back to continue to decompress and recompress infrequently utilized pages of data. This looping continues until processing should stop monitoring memory 130, at which point decision 650 branches to the "No" branch, whereupon processing ends at 660.

FIG. 7 is a flowchart showing steps taken in decompressing a compressed page of data that is infrequently utilized. Processing commences at 700, whereupon processing identifies the address of the infrequently utilized compressed page of data at step 710. At step 720, processing walks binary tree 725 to locate a node corresponding to the compressed page of data's address. Once processing locates the node, processing retrieves a memory block address from the node at step 730 that stores the compressed page of data.

At step 740, processing decompresses the page of data and stores the decompressed page of data in memory 130's uncompressed area 135. Processing combines the newly unallocated memory block (the memory block that included the compressed page of data) with adjacent memory blocks to create a larger, combined memory block at step 750 (see FIG. 4 and corresponding text for further details).

Processing, at step 760, computes a pre-defined memory block size of the combined memory block. For example, assuming the newly unallocated memory block is 128 B and is combined with an adjacent unallocated memory block that is 256 B, the combined memory block size is 384 B.

At step 770, processing updates one of linked lists 150 that correspond to the computed memory block size (e.g., add a link to include the address location of the combined memory block). In one embodiment, if the linked list does not yet include a link, processing creates a first link in the corresponding linked list and updates a corresponding index in index array 145 that points to the first link (see FIG. 3 and corresponding text for further details). Processing returns at 780.

Figure 8:
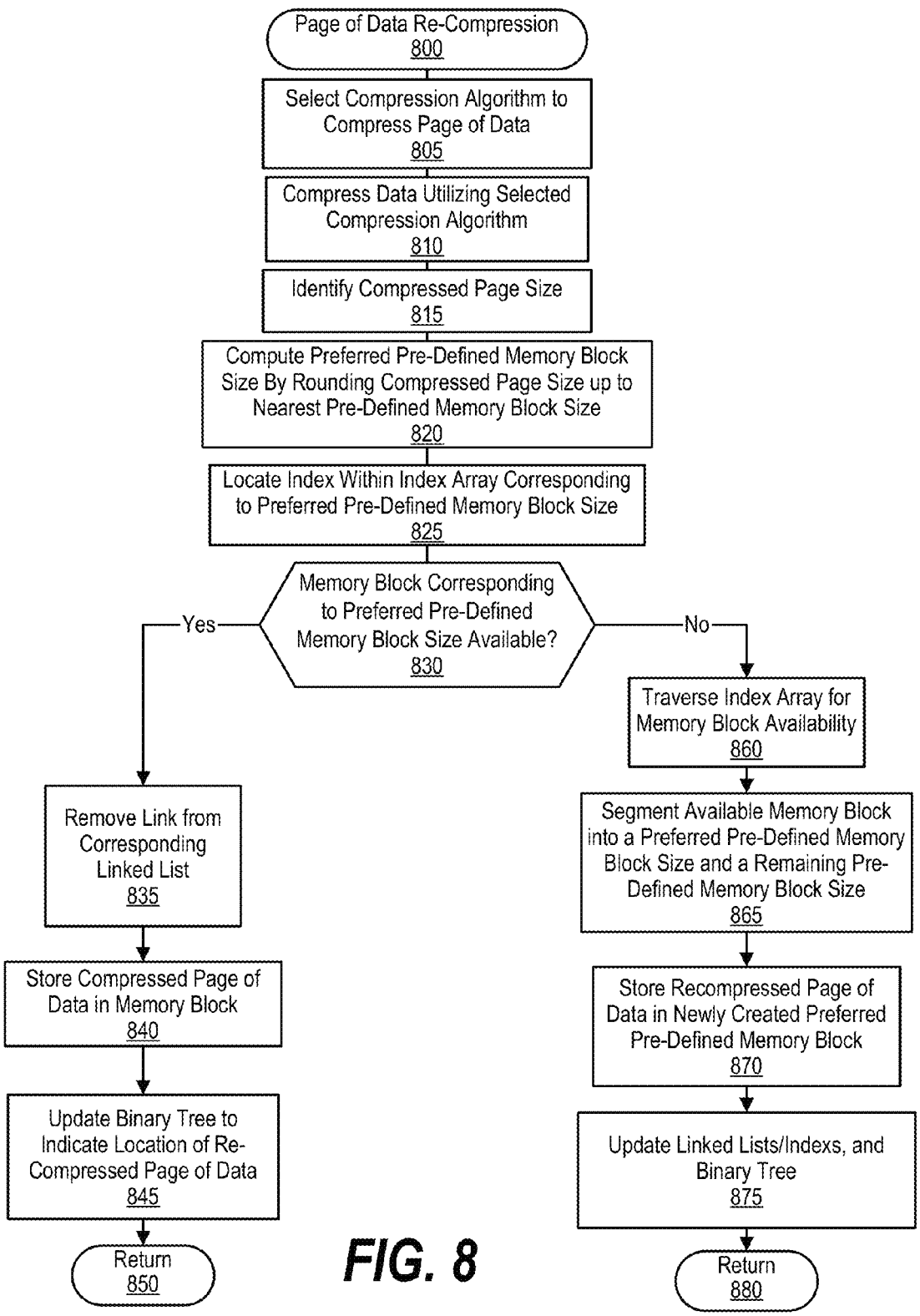
FIG. 8 is a flowchart showing steps taken in recompressing a page of data to increase compression space savings.

FIG. 8 is a flowchart showing steps taken in recompressing a page of data to increase compression space savings. Recompression processing commences at 800, whereupon processing selects a compression algorithm to compress the page of data at a higher compression (smaller size) compared to its previous compression (larger size) (step 805). Next, processing compresses the page of data using the selected algorithm at step 810, and identifies the size of the compressed page of data (compressed page size) at step 815. Processing, at step 820, computes a preferred pre-defined memory block size by rounding the compressed page size up to the nearest pre-defined memory block size. For example, assuming the compressed page size is 320 B, processing selects a 384 B pre-defined block size.

At step 825, processing accesses index array 145 and evaluates the contents of the index corresponding to the preferred pre-defined memory block size (e.g., 384 B index). A determination is made as to whether there is an unallocated memory block corresponding to the preferred pre-defined block size, such as by determining if a pointer is stored in the corresponding index (decision 830). If a memory block is unallocated having the preferred pre-defined block size, decision 830 branches to the "Yes" branch, whereupon processing removes the link corresponding to unallocated memory block from its corresponding linked list at step 835. In one embodiment, if the removed link is the "first" link in the linked list, processing may also remove a pointer from the corresponding index included in index array 145.

At step 840, processing stores the recompressed page of data in the memory block and, at step 845, processing adds a node to the binary tree that includes an address of the recompressed page of data and the address of its corresponding memory block. Processing returns at 850.

On the other hand, referring back to step 830, if a memory block corresponding to the preferred pre-defined memory block size is not available, decision 830 branches to the "No" branch, whereupon processing traverses index array 145 to locate the next larger size of unallocated memory block (step 860). For example, assuming that the preferred memory block size is 256 B but a 256 B memory blocks is not available, processing evaluates index array 145's next index (384 B) to determine whether a 384 B memory block is available. If a 384 B memory block is not available, processing evaluates the next index (512 B), and so on, until processing locates an index that indicates an available memory block.

At step 865, processing segments the next larger available memory block into the preferred pre-defined memory block size (from step 820 above) and a "remaining" pre-defined memory block size. Continuing with the example above, processing may segment a 1024 B memory block into a 256 B memory block (preferred pre-defined memory block size) and a remaining memory block of 768 B. At step 870, processing stores the recompressed page of data in the newly created memory block having the preferred pre-defined memory block size.

At step 875, processing updates linked lists, indexes, and binary trees (e.g., adding a binary tree node) accordingly. Continuing with the example above, processing removes a link from the 1024 B linked list (since the 1024 B memory block was segmented into a 256 B memory block and a 764 B memory block) and adds a link to the 764 B linked list (identifies the remaining unallocated memory block). In this example, processing may update the indexes in index array 145 corresponding to the 1024 B linked list and/or the 764 B linked list if a first link is added to/removed from their corresponding linked lists (see FIG. 3 and corresponding text for further details). Processing returns at 880.

Figure 9:
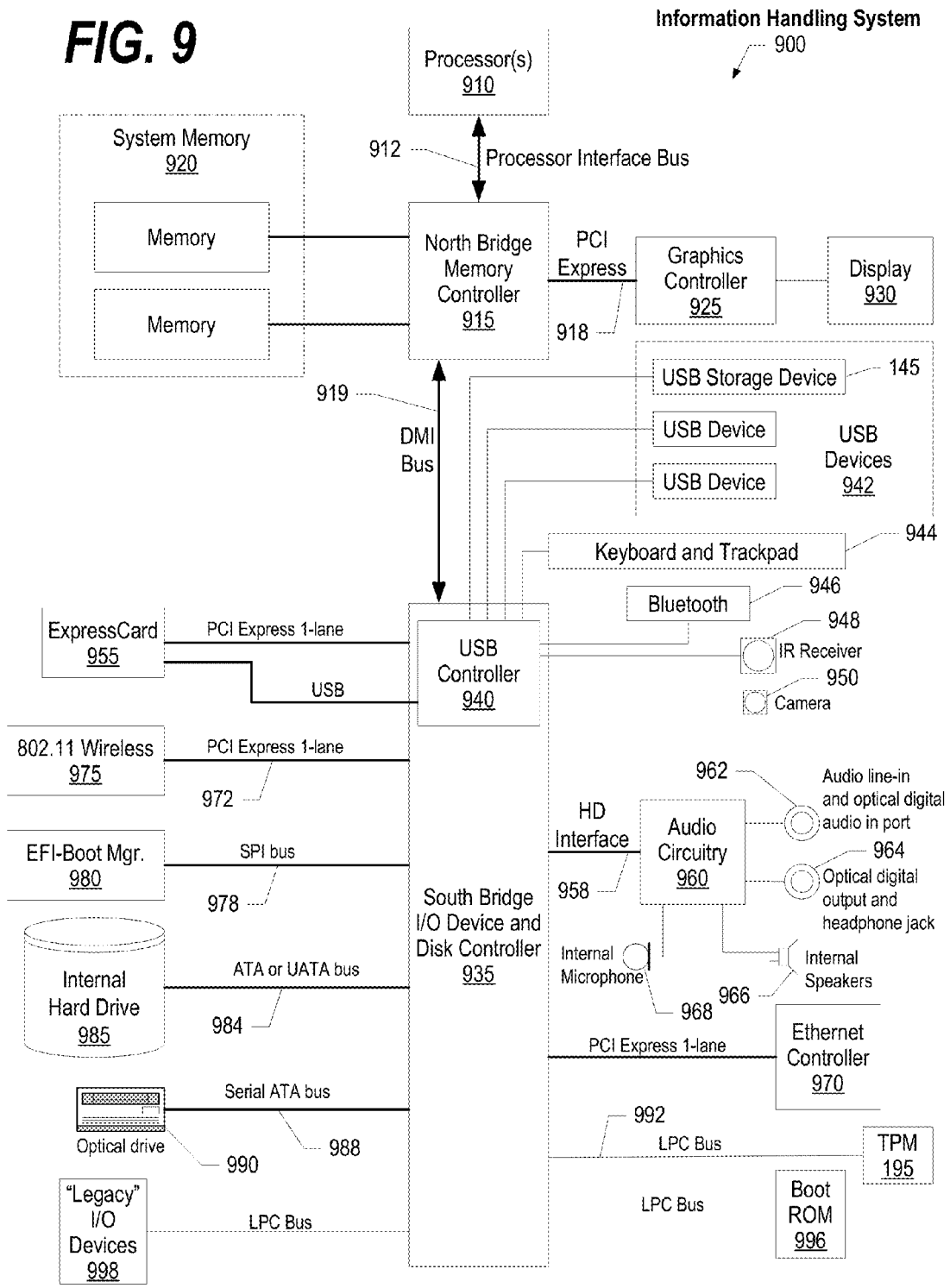
FIG. 9 is a block diagram of a data processing system in which the methods described herein can be implemented.

FIG. 9 illustrates information handling system 900, which is a simplified example of a computer system capable of performing the computing operations described herein. Information handling system 900 includes one or more processors 910 coupled to processor interface bus 912. Processor interface bus 912 connects processors 910 to Northbridge 915, which is also known as the Memory Controller Hub (MCH). Northbridge 915 connects to system memory 920 and provides a means for processor(s) 910 to access the system memory. Graphics controller 925 also connects to Northbridge 915. In one embodiment, PCI Express bus 918 connects Northbridge 915 to graphics controller 925. Graphics controller 925 connects to display device 930, such as a computer monitor.

Northbridge 915 and Southbridge 935 connect to each other using bus 919. In one embodiment, the bus is a Direct Media Interface (DMI) bus that transfers data at high speeds in each direction between Northbridge 915 and Southbridge 935. In another embodiment, a Peripheral Component Interconnect (PCI) bus connects the Northbridge and the Southbridge. Southbridge 935, also known as the I/O Controller Hub (ICH) is a chip that generally implements capabilities that operate at slower speeds than the capabilities provided by the Northbridge. Southbridge 935 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 996 and "legacy" I/O devices (using a "super I/O" chip). The "legacy" I/O devices (998) can include, for example, serial and parallel ports, keyboard, mouse, and/or a floppy disk controller. The LPC bus also connects Southbridge 935 to Trusted Platform Module (TPM) 995. Other components often included in Southbridge 935 include a Direct Memory Access (DMA) controller, a Programmable Interrupt Controller (PIC), and a storage device controller, which connects Southbridge 935 to nonvolatile storage device 985, such as a hard disk drive, using bus 984.

ExpressCard 955 is a slot that connects hot-pluggable devices to the information handling system. ExpressCard 955 supports both PCI Express and USB connectivity as it connects to Southbridge 935 using both the Universal Serial Bus (USB) the PCI Express bus. Southbridge 935 includes USB Controller 940 that provides USB connectivity to devices that connect to the USB. These devices include webcam (camera) 950, infrared (IR) receiver 948, keyboard and trackpad 944, and Bluetooth device 946, which provides for wireless personal area networks (PANs). USB Controller 940 also provides USB connectivity to other miscellaneous USB connected devices 942, such as a mouse, removable nonvolatile storage device 945, modems, network cards, ISDN connectors, fax, printers, USB hubs, and many other types of USB connected devices. While removable nonvolatile storage device 945 is shown as a USB-connected device, removable nonvolatile storage device 945 could be connected using a different interface, such as a Firewire interface, etcetera.

Wireless Local Area Network (LAN) device 975 connects to Southbridge 935 via the PCI or PCI Express bus 972. LAN device 975 typically implements one of the IEEE 802.11 standards of over-the-air modulation techniques that all use the same protocol to wireless communicate between information handling system 900 and another computer system or device. Optical storage device 990 connects to Southbridge 935 using Serial ATA (SATA) bus 988. Serial ATA adapters and devices communicate over a high-speed serial link. The Serial ATA bus also connects Southbridge 935 to other forms of storage devices, such as hard disk drives. Audio circuitry 960, such as a sound card, connects to Southbridge 935 via bus 958. Audio circuitry 960 also provides functionality such as audio line-in and optical digital audio in port 962, optical digital output and headphone jack 964, internal speakers 966, and internal microphone 968. Ethernet controller 970 connects to Southbridge 935 using a bus, such as the PCI or PCI Express bus. Ethernet controller 970 connects information handling system 900 to a computer network, such as a Local Area Network (LAN), the Internet, and other public and private computer networks.

While FIG. 9 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 995) shown in FIG. 9 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 10.

Figure 10:
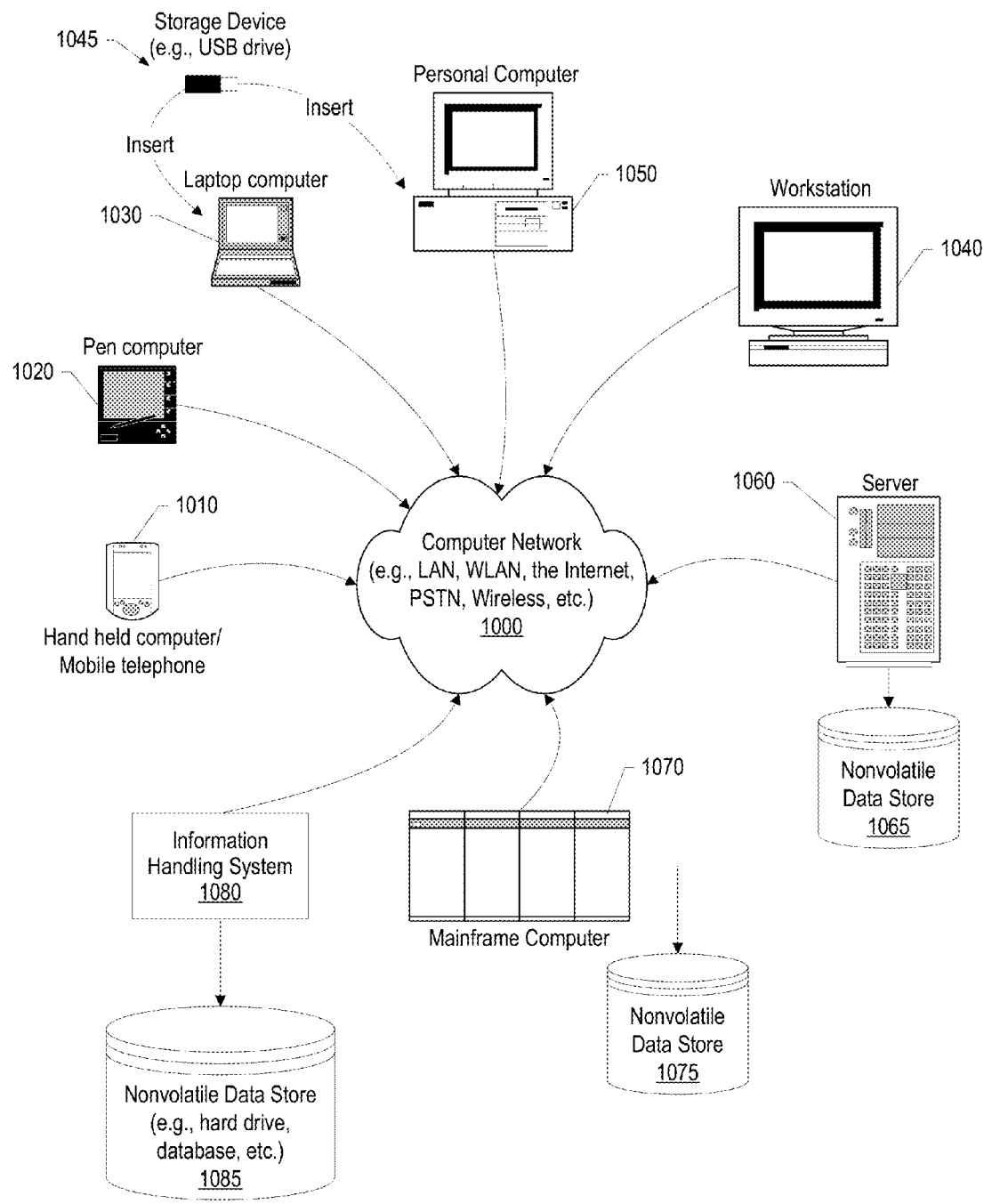
FIG. 10 provides an extension of the information handling system environment shown in FIG. 9 to illustrate that the methods described herein can be performed on a wide variety of information handling systems which operate in a networked environment.

FIG. 10 provides an extension of the information handling system environment shown in FIG. 9 to illustrate that the methods described herein can be performed on a wide variety of information handling systems that operate in a networked environment. Types of information handling systems range from small handheld devices, such as handheld computer/mobile telephone 1010 to large mainframe systems, such as mainframe computer 1070. Examples of handheld computer 1010 include personal digital assistants (PDAs), personal entertainment devices, such as MP3 players, portable televisions, and compact disc players. Other examples of information handling systems include pen, or tablet, computer 1020, laptop, or notebook, computer 1030, workstation 1040, personal computer system 1050, and server 1060. Other types of information handling systems that are not individually shown in FIG. 10 are represented by information handling system 1080. As shown, the various information handling systems can be networked together using computer network 1000. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 10 depicts separate nonvolatile data stores (server 1060 utilizes nonvolatile data store 1065, mainframe computer 1070 utilizes nonvolatile data store 1075, and information handling system 1080 utilizes nonvolatile data store 1085). The nonvolatile data store can be a component that is external to the various information handling systems or can be internal to one of the information handling systems. In addition, removable nonvolatile storage device 945 can be shared among two or more information handling systems using various techniques, such as connecting the removable nonvolatile storage device 945 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
selecting, by one or more processors, a page of data that is compressed by a first compression algorithm, wherein the compressed page of data is stored in a first one of a plurality of memory blocks;
decompressing the page of data by the first compression algorithm, resulting in a decompressed page of data;
storing the decompressed page of data into an uncompressed memory area;
combining the first memory block with one or more of the plurality of memory blocks that are unallocated, resulting in a larger memory block;
identifying one of a plurality of pre-defined memory block sizes corresponding to the larger memory block;
updating one of a plurality of linked lists corresponding to the identified pre-defined memory block size to indicate that the larger memory block is unallocated;
recompressing, by one of the processors, the page of data using a second compression algorithm in response to determining that the compressed page of data is utilized less than a utilization threshold, the recompressing resulting in a recompressed page of data;
determining a size of the recompressed page of data;
selecting one of the plurality of pre-defined memory block sizes based upon the size of the recompressed page of data, wherein each of the plurality of pre-defined memory block sizes corresponds to a size of a memory block located in memory;
identifying, in an index array, one of a plurality of indexes that is assigned to the selected pre-defined memory block size;
determining whether the identified index includes a pointer that points to one of the plurality of linked lists comprising an address location of a second one of the plurality of memory blocks that corresponds to the selected pre-defined memory block size; and
in response to determining that the identified index includes the pointer, storing the recompressed page of data in the second memory block.

2. The method of claim 1 wherein, prior to storing the recompressed page of data in the second memory block, the method further comprises:
identifying the larger memory block from the plurality of memory blocks in response to determining that the address location corresponding to the second memory block is unavailable; and segmenting the larger memory block into a third memory block and a fourth memory block, wherein the third memory block corresponds to the selected predefined memory block size and the fourth memory block corresponds to at least one of the plurality of pre-defined memory block sizes.

3. The method of claim 1 wherein the first memory block and the second memory block are co-located in a same one of a plurality of memory hierarchy levels accessible by one or more of the processors.

4. The method of claim 1 wherein the page of data is included in a plurality of pages of data, and wherein the plurality of memory blocks concurrently store one or more of the plurality of pages of data generated by the first compression algorithm and one or more of the plurality of pages of data generated by the second compression algorithm.

* * * * *